(12) United States Patent
Tranchina (10) Patent No.: US 8,730,413 B2
(45) Date of Patent: May 20, 2014

(54) REAR SEAT ENTERTAINMENT SYSTEM FOR A VEHICLE HAVING AN ACTIVE HEADREST

(75) Inventor: James R. Tranchina, Dix Hills, NY (US)

(73) Assignee: Voxx International Corporation, Hauppauge, NY (US)

( * ) Notice: Subject to any disclaimer, the term of this patent is extended or adjusted under 35 U.S.C. 154(b) by 1096 days.

(21) Appl. No.: 11/969,627

(22) Filed: Jan. 4, 2008

(65) Prior Publication Data

US 2008/0165293 A1 Jul. 10, 2008

Related U.S. Application Data (60) Provisional application No. 60/883,536, filed on Jan. 5, 2007.

(51) Int. Cl.
*H04N 5/64* (2006.01)

(52) U.S. Cl.
USPC .......................................................... 348/837

(58) Field of Classification Search
USPC ......................................... 348/148–149, 837
See application file for complete search history.

(56) References Cited

U.S. PATENT DOCUMENTS

| | | | | |
|---|---|---|---|---|
| 4,647,980 A | * | 3/1987 | Steventon et al. | ............ 348/837 |
| 6,669,285 B1 | | 12/2003 | Park et al. | |
| 7,036,879 B2 | * | 5/2006 | Chang | ........................ 297/217.3 |
| 7,070,237 B2 | * | 7/2006 | Rochel | ........................ 297/217.3 |
| 7,201,443 B2 | * | 4/2007 | Cilluffo et al. | ........... 297/188.06 |
| 7,218,360 B2 | * | 5/2007 | Schedivy | ....................... 348/838 |
| 2006/0032946 A1 | * | 2/2006 | Cooper et al. | ................. 239/532 |
| 2006/0079306 A1 | * | 4/2006 | Zheng | ......................... 455/575.9 |
| 2006/0087163 A1 | * | 4/2006 | Cilluffo et al. | ........... 297/188.04 |
| 2008/0088158 A1 | * | 4/2008 | Yokota et al. | ............ 297/216.12 |

FOREIGN PATENT DOCUMENTS

| | | |
|---|---|---|
| EP | 1994858 | 11/2008 |
| EP | 1655177 | 5/2011 |

OTHER PUBLICATIONS

International Search Report dated Jun. 27, 2008 from International Patent Application No. PCT/US08/50269.
Supplementary European Search Report dated Feb. 17, 2011 of for Application No. 80727365.2.

* cited by examiner

*Primary Examiner* — Dave Czekaj
*Assistant Examiner* — Leron Beck
(74) *Attorney, Agent, or Firm* — F. Chau & Associates, LLC (57) ABSTRACT

An entertainment system for a vehicle seat comprises a support structure mounted to a frame of the vehicle seat, and a media unit mounted to the support structure, wherein the support structure includes a frame positioned behind and spaced apart from a headrest of the vehicle seat. The support structure frame includes a plurality of bends to position the support structure frame away from the headrest.

21 Claims, 7 Drawing Sheets

REAR SEAT ENTERTAINMENT SYSTEM FOR A VEHICLE HAVING AN ACTIVE HEADREST

CROSS-REFERENCE TO RELATED APPLICATION

This application claims the benefit of Provisional Application Ser. No. 60/883,536, filed on Jan. 5, 2007, the contents of which are herein incorporated by reference in their entirety.

BACKGROUND OF THE INVENTION

1. Technical Field

The present disclosure relates to a rear seat entertainment (RSE) system for a vehicle having an active headrest (AHR).

2. Discussion of the Related Art

Vehicles, such as automobiles, minivans or sport utility vehicles (SUVs), may be equipped with AHRs, which are capable of sensing an impact and, in the event of a crash, automatically moving in an effort to prevent injuries to a passenger. The motion may be accomplished by signals sent from impact sensors to a motor located in the headrest for automatically moving the headrest to a better position supporting a passenger's head and neck.

Entertainment systems, including video displays and media players, such as a digital video disk (DVD) player, have been positioned in a traditional headrest of a vehicle such that passengers sitting to the rear of a seat can watch or listen to programming playing on the entertainment system mounted in the headrest. Such programming may include video and audio content.

An entertainment system mounted in an AHR may impede the function of the AHR by, for example, adding weight to the headrest so that the range of motion or responsiveness of the headrest to an impact may be limited. Accordingly, there is a need for an RSE system that can be mounted behind and separate from an AHR, so as not to impede the function of the AHR.

SUMMARY OF THE INVENTION

An entertainment system for a vehicle seat, according to an embodiment of the present invention, comprises a support structure mounted to a frame of the vehicle seat, and a media unit mounted to the support structure, wherein the support structure includes a frame positioned behind and spaced apart from a headrest of the vehicle seat.

The support structure frame may include a plurality of bends to position the support structure frame away from the headrest. The support structure frame may be formed in a substantial U-shape.

The support structure may include a plate mounted to the support structure frame. A housing of the media unit may be mounted to the plate. The plate may include a plurality of holes corresponding to a plurality of holes in the housing of the media unit for receiving fixing devices therethrough.

The support structure may include a mounting bracket mounted to the support structure frame, wherein the mounting bracket includes a plurality of stepped flange portions to receive respective portions of the support structure frame.

The support structure may include a clamp mounted thereto and the clamp may include a plurality of protrusions extending from the clamp to pass through and engage holes in the frame of the vehicle seat.

The support structure may include a clamp mounted thereto and the clamp may include a first plurality of holes corresponding to a second plurality of holes in the frame of the seat, wherein a fixing device is received through each of the plurality of first and second holes to secure the clamp to the frame of the seat.

The support structure may include a mounting bracket mounted to the support structure frame and a mounting bracket clamp coupled to the mounting bracket, wherein the mounting bracket clamp engages the frame of the seat to couple the support structure to the frame of the seat.

The headrest may automatically move through a predetermined range of motion without contacting the support structure frame.

The media unit may include a screen for displaying video.

An entertainment system for a vehicle seat, according to an embodiment of the present invention, comprises a support structure mounted to a frame of the vehicle seat, wherein the support structure is positioned behind and spaced apart from a headrest of the vehicle, and a media unit mounted to the support structure.

The support structure may include a frame and the media unit may be mounted to the frame. The support structure frame may be formed in a substantial U-shape and the media unit may be positioned between opposing sides of the substantial U-shape.

The support structure may include a plurality of bends to position the support structure away from the headrest. The support structure may include a plate mounted to the support structure, wherein a housing of the media unit is mounted to the plate.

BRIEF DESCRIPTION OF THE DRAWINGS

Exemplary embodiments of the present invention will be described below in more detail, with reference to the accompanying drawings, in which.

DETAILED DESCRIPTION OF EXEMPLARY EMBODIMENTS

Exemplary embodiments of the present invention now will be described more fully hereinafter with reference to the accompanying drawings. This invention may, however, be embodied in many different forms and should not be construed as limited to the embodiments set forth herein.

Figure 1:
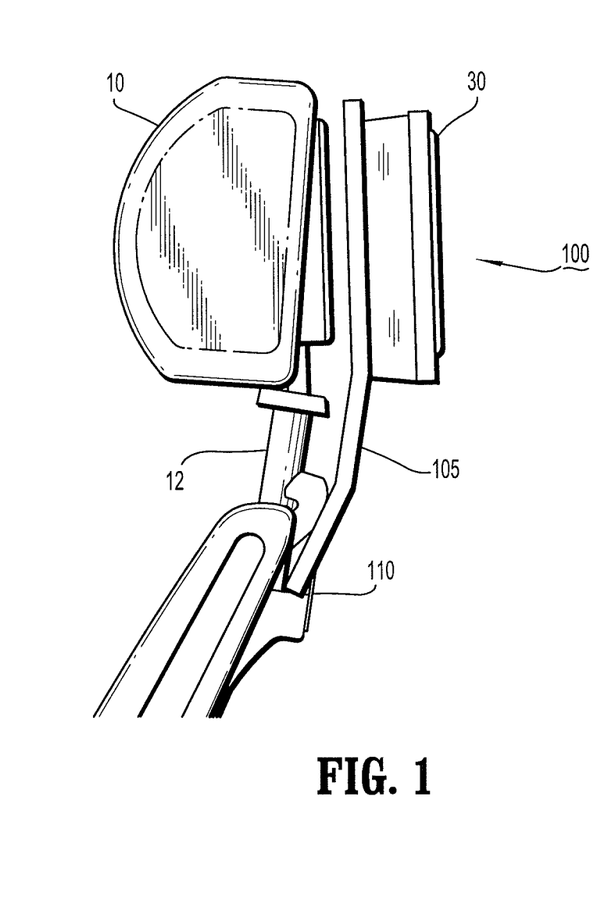
FIGS. 1 and 2 show side perspective views of an entertainment system mounted to a seat frame, according to an embodiment of the present invention.
Figure 2:
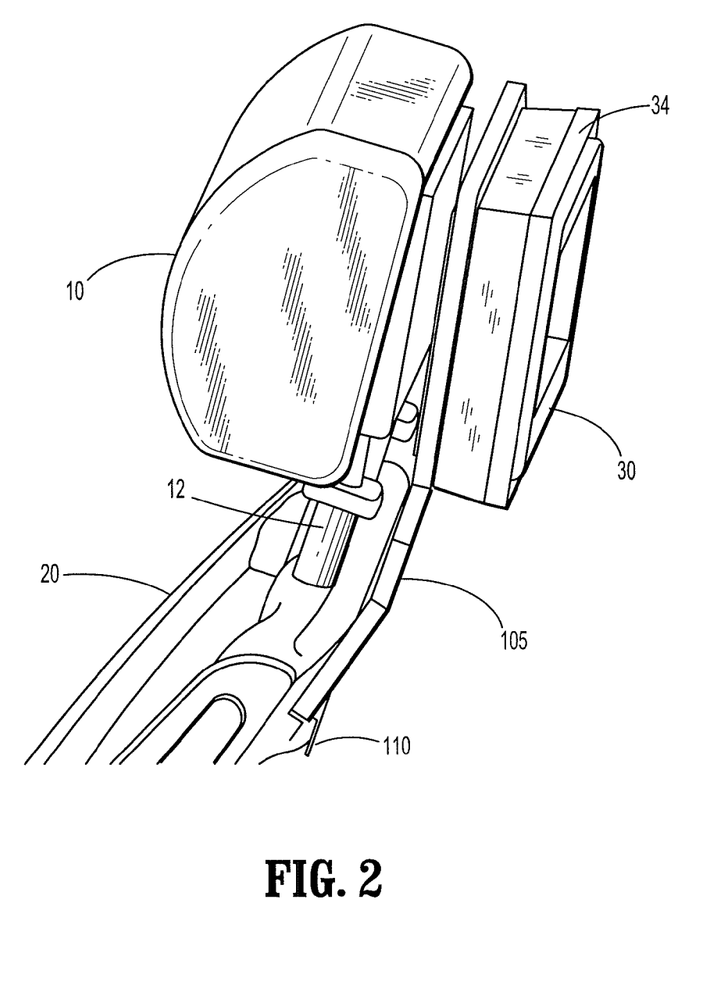
Figure 3:
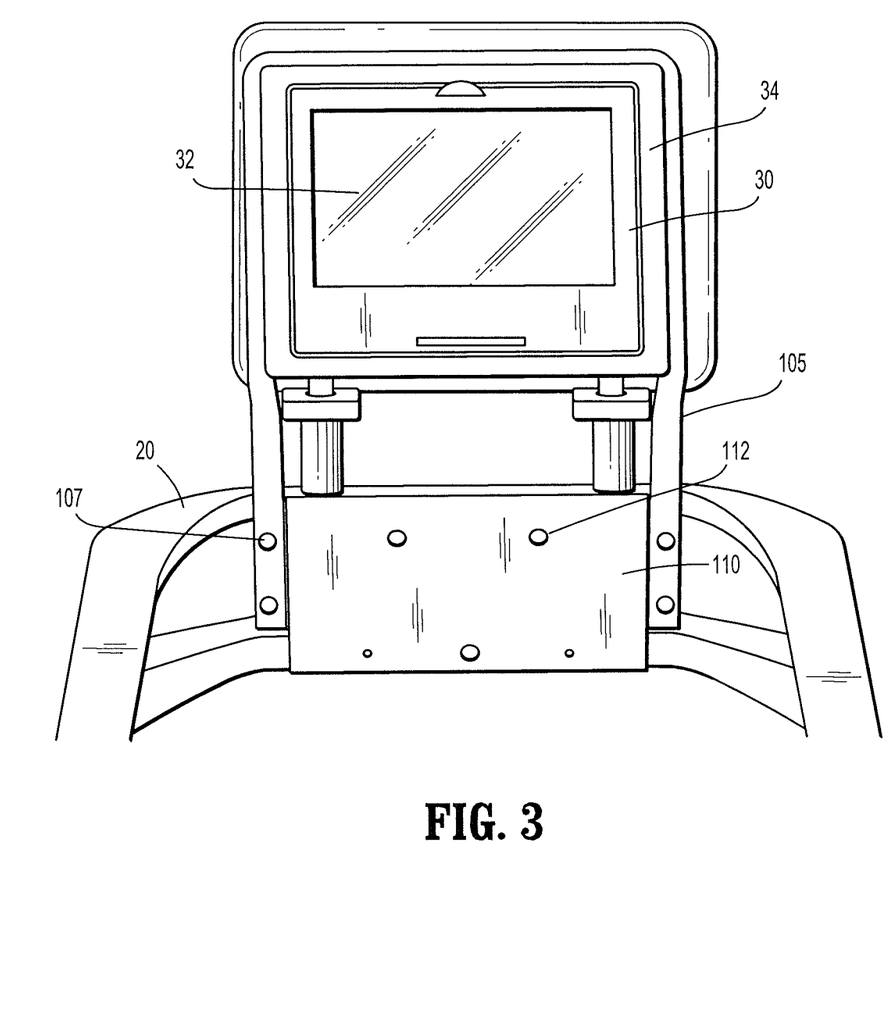
FIG. 3 shows a front perspective view of an entertainment system mounted to a seat frame, according to an embodiment of the present invention.
Figure 4:
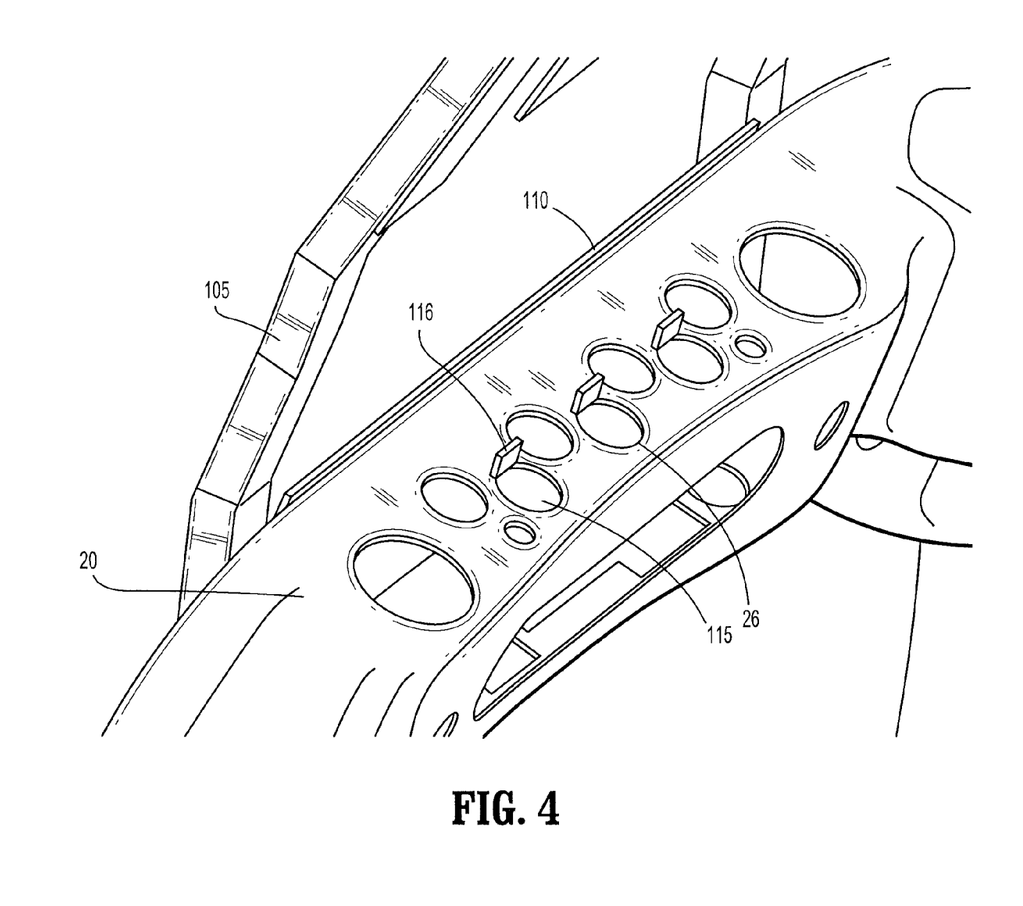
FIG. 4 shows a top perspective view of a support structure of an entertainment system mounted to a seat frame, according to an embodiment of the present invention.

Referring to FIGS. 1-3, an entertainment system 100 includes a media unit 30 mounted to a support structure 105, which is mounted to a mounting bracket 110. The entertainment system 100 is positioned behind and separate from a headrest 10.

The media unit 30 includes a screen 32 for displaying video, and is positioned in a housing 34. The screen may be, for example, an LCD type display, but may be another type of display, such as, for example, an organic LED or electroluminescent display. The media unit 30 may include a DVD player, or other type of media player for supplying programming, such as audio and/or video. The DVD player can be positioned behind the screen 32 and may be accessed by pivoting the media unit outward with respect to the housing 34. The media source may also be, for example, a CD-ROM player, a video game player, a videocassette player, a television tuner, a radio tuner, a wireless receiver, an MP3/MP4 player, a digital video recorder (DVR), and/or a device for playing media supplied from a portable storage device (e.g., a portable hard drive, memory cards, flash memory sticks, key drives, thumb drives). The media unit 30 may include a memory device, for example, a DVR, which receives and stores video programming, and hardware for playing such programming. Alternatively, the display 32 can be electrically connected to a media source in another location of the vehicle via a wired or wireless connection.

Figure 5:
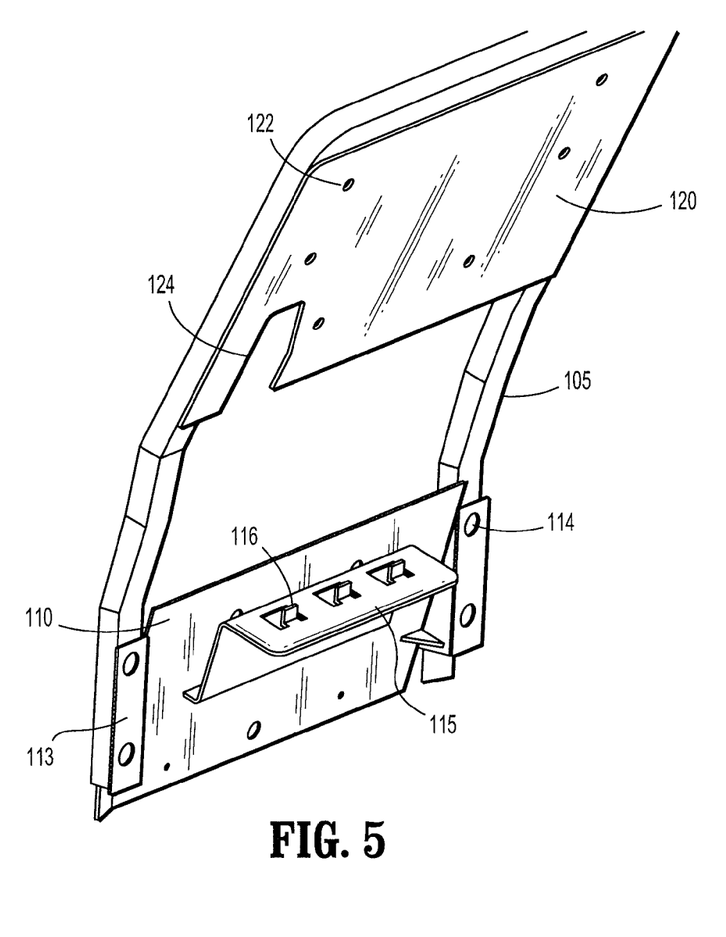
FIG. 5 shows a perspective view of a support structure of an entertainment system, according to an embodiment of the present invention.
Figure 7:
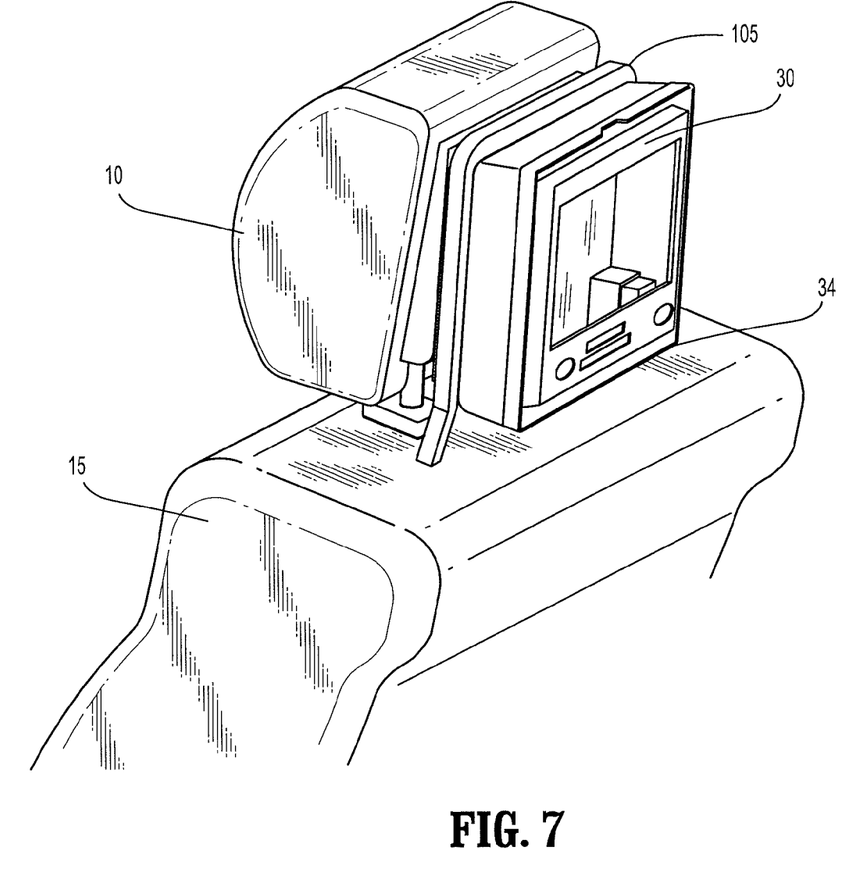
FIG. 7 shows a perspective view of an entertainment system mounted to a seat, according to an embodiment of the present invention.

Referring to FIG. 5, the support structure 105 includes a frame formed in a substantially upside-down U-shape, wherein the frame is angled at portions thereof depending on the angle of a seat and a desired positioning of the screen 32 for optimal viewing angles. Further, as shown in FIGS. 1, 2 and 7, the frame is angled away from the headrest 10 so as not to interfere with the function of an AHR. It is to be understood that the angles and bends in the frame may be subject to change depending on the configuration of the headrest 10, seat 15 and seat frame 20.

The support structure 105 includes a plate 120 including a plurality of holes 122 and a cut-out section 124. The housing 34 is mounted to the plate 120 using a plurality of fixing devices (e.g., screws, nuts, bolts, rivets) positioned through the holes 122 and through corresponding holes (not shown) in the housing 34. Alternatively, the housing can be molded to the plate 120 or adhered to the plate 120 using an adhesive. In another embodiment, the housing 34 can be directly attached to the U-shaped frame around a perimeter of the housing 34. The plate 120 can be, for example, molded to, adhered to, or fixed with fixing devices to the U-shaped frame.

The cut-out section 124 of the plate 120 allows for electrical wiring to be fed to and/or from the media unit 30 up or down the headrest to make connections to components, such as, for example, a vehicle sound system, or media sources located in other portions of the vehicle.

Figure 6:
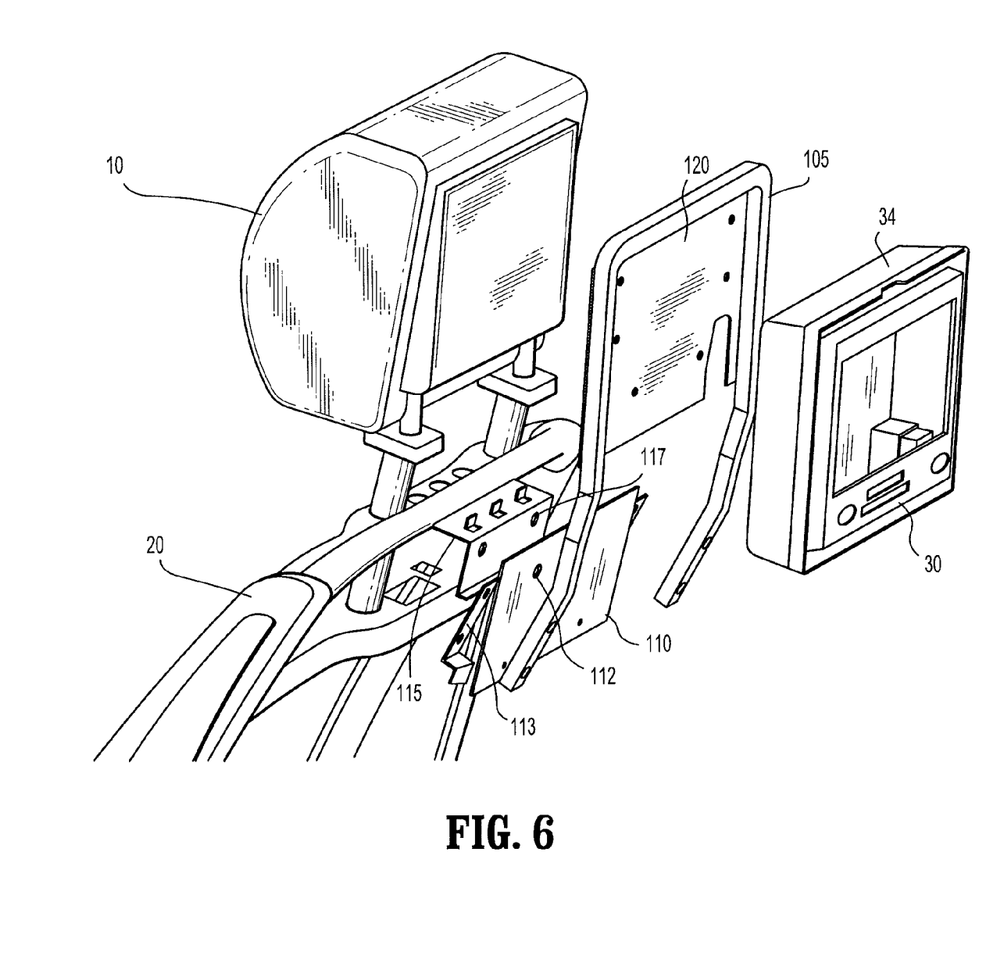
FIG. 6 shows an exploded perspective view of an entertainment system, according to an embodiment of the present invention.

The support structure 105 includes a mounting bracket 110 mounted thereto. The mounting bracket 110 is attached to the support structure 105 via fixing devices (e.g., screws, nuts, bolts, rivets) passed through holes 114 in the mounting bracket 110 and corresponding holes 107 formed in the support structure 105. The holes 114 are formed in angled flange portions 113 that extend from sides of the mounting bracket 110. Referring to FIGS. 5 and 6, the flange portions 113 are stepped with respect to the main body portion of the mounting bracket 110 so as to receive part of the U-shaped frame in the stepped portion. The angle and configuration of the flange portions 113 may vary in accordance with the design of the seat, seat frame, and/or U-shaped frame. In alternative embodiments, the mounting bracket 110 can be molded or adhered to the frame of the support structure 105.

A mounting bracket clamp 115 is coupled to the mounting bracket 110. The clamp 115 includes a plurality of protrusions 116 extending from the clamp 115. The protrusions 116 are passed through and engage holes 26 in the seat frame 20 to secure the clamp 115 to the seat frame 20. In addition, the clamp 115 has an L-shape, and includes holes 117 formed therethrough. The holes 117 are formed to correspond to holes 112 formed in the mounting bracket 110 to couple the mounting bracket 110 to the clamp 115 using fixing devices. In addition, holes formed in the clamp 115, such as holes 117, may also correspond to holes formed in the seat frame 20 to further secure the clamp 115 to the seat frame 20 using fixing devices. In alternative embodiments, the clamp 115 and mounting bracket 110 can be molded or adhered to each other, and the clamp 115 can be molded or adhered to the seat frame 20.

Referring to FIGS. 1, 2 and 7, the entertainment system 100, including the support structure 105, is mounted to a seat 15 and seat frame 20, and angled away from a headrest 10, so as not to interfere with movement of an AHR 10 or headrest posts 12 in the event of a crash. Further, even if a headrest 10 is not an AHR, the embodiments of the present invention provide an entertainment system mounting structure sufficiently separate from the headrest to enable free motion of the headrest for desired adjustment.

Although exemplary embodiments of the present invention have been described hereinabove, it should be understood that the present invention is not limited to these embodiments, but may be modified by those skilled in the art without departing from the spirit and scope of the present invention, as defined in the appended claims.

What is claimed is:

1. An entertainment system for a vehicle seat, comprising:
a support structure mounted to a frame of the vehicle seat; and
a media unit mounted to the support structure, wherein the support structure includes a frame positioned behind and spaced apart from a headrest of the vehicle seat, wherein the support structure frame extends through a top surface of the vehicle seat from inside to outside of the vehicle seat without contacting a post supporting the headrest on the vehicle seat, the support structure frame including a first segment extending away from the seat, a second segment extending from the first segment at an obtuse angle less than 180 degrees with respect to the first segment, and a third segment extending from the second segment at an obtuse angle less than 180 degrees with respect to the second segment, wherein the first, second and third segments are disposed outside the vehicle seat and first and second edges of the media unit are covered by the third segment.

2. The entertainment system of claim 1, wherein the support structure frame includes a plurality of bends to position the support structure frame away from the headrest, wherein a first bend is the obtuse angle with respect to the first segment, and a second bend is the obtuse angle with respect to the second segment.

3. The entertainment system of claim 1, wherein the support structure frame is formed in a substantial U-shape.

4. The entertainment system of claim 1, wherein the support structure includes a plate mounted to the support structure frame.

5. The entertainment system of claim 4, wherein a housing of the media unit is mounted to the plate.

6. The entertainment system of claim 5, wherein the plate includes a plurality of holes corresponding to a plurality of holes in the housing of the media unit for receiving fixing devices therethrough.

7. The entertainment system of claim 1, wherein the support structure includes a mounting bracket mounted to the support structure frame, and wherein the mounting bracket includes a plurality of stepped flange portions to receive respective portions of the support structure frame.

8. The entertainment system of claim 1, wherein the support structure includes a clamp mounted thereto and the clamp includes a plurality of protrusions extending from the clamp to pass through and engage holes in the frame of the vehicle seat.

9. The entertainment system of claim 1, wherein the support structure includes a clamp mounted thereto and the clamp includes a first plurality of holes corresponding to a second plurality of holes in the frame of the seat, wherein a fixing device is received through each of the plurality of first and second holes to secure the clamp to the frame of the seat.

10. The entertainment system of claim 1, wherein the support structure includes a mounting bracket mounted to the support structure frame and a mounting bracket clamp coupled to the mounting bracket, wherein the mounting bracket clamp engages the frame of the seat to couple the support structure to the frame of the seat.

11. The entertainment system of claim 1, wherein the headrest automatically moves through a predetermined range of motion without contacting the support structure frame.

12. The entertainment system of claim 1, wherein the media unit includes a screen for displaying video.

13. An entertainment system for a vehicle seat, comprising:
a support structure mounted to a frame of the vehicle seat, wherein the support structure is positioned behind and spaced apart from a headrest of the vehicle; and
a media unit mounted to the support structure, wherein the support structure extends through a top surface of the vehicle seat from inside to outside of the vehicle seat without contacting a post supporting the headrest on the vehicle seat, wherein the support structure includes a frame and the media unit is mounted to the frame, the support structure frame including a first segment extending away from the seat, a second segment extending from the first segment at an obtuse angle less than 180 degrees with respect to the first segment, and a third segment extending from the second segment at an obtuse angle less than 180 degrees with respect to the second segment, wherein the first, second and third segments are disposed outside the vehicle seat and a back-side of the media unit is entirely overlapped by the third segment.

14. The entertainment system of claim 13, wherein the support structure frame is formed in a substantial U-shape and the media unit is positioned between opposing sides of the substantial U-shape.

15. The entertainment system of claim 13, wherein the support structure frame includes a plurality of bends to position the support structure frame away from the headrest, wherein a first bend is the obtuse angle with respect to the first segment, and a second bend is the obtuse angle with respect to the second segment.

16. The entertainment system of claim 13, wherein the support structure includes a plate mounted to the support structure frame.

17. The entertainment system of claim 16, wherein a housing of the media unit is mounted to the plate.

18. The entertainment system of claim 13, wherein the support structure includes a clamp mounted thereto and the clamp includes a plurality of protrusions extending from the clamp to pass through and engage holes in the frame of the vehicle seat.

19. The entertainment system of claim 13, wherein the support structure includes a clamp mounted thereto and the clamp includes a first plurality of holes corresponding to a second plurality of holes in the frame of the seat, wherein a fixing device is received through each of the plurality of first and second holes to secure the clamp to the frame of the seat.

20. The entertainment system of claim 13, wherein the headrest automatically moves through a predetermined range of motion without contacting the support structure frame.

21. The entertainment system of claim 13, wherein the media unit includes a screen for displaying video.

* * * * *